United States Patent [19]

Davies et al.

[11] 4,048,092
[45] * Sept. 13, 1977

[54] CATALYTIC MIXTURE AND METHOD OF USE THEREFOR

[75] Inventors: Ronald F. Davies, Elkton, Md.; George J. Benvegno, Aston, Pa.

[73] Assignee: Colonial Metals, Inc., Elkton, Md.

[*] Notice: The portion of the term of this patent subsequent to Sept. 10, 1991, has been disclaimed.

[21] Appl. No.: 609,494

[22] Filed: Sept. 2, 1975

Related U.S. Application Data

[62] Division of Ser. No. 338,352, March 5, 1973, Pat. No. 3,915,350.

[51] Int. Cl.² .................................................. B01D 15/06
[52] U.S. Cl. .............................. 252/412; 252/466 PT; 427/236
[58] Field of Search ........... 427/236, 238, 239, 383 C; 106/1; 252/412, 466 PT; 222/192, 394

[56] References Cited

U.S. PATENT DOCUMENTS

| | | | |
|---|---|---|---|
| 3,129,855 | 4/1964 | Malakoff et al. | 222/394 |
| 3,723,158 | 3/1973 | Miller | 427/343 |
| 3,835,066 | 9/1974 | Davies et al. | 427/383 A |
| 3,887,740 | 6/1975 | Foster et al. | 427/238 |

*Primary Examiner*—Ronald H. Smith
*Assistant Examiner*—Sam Silverberg
*Attorney, Agent, or Firm*—Walter G. Finch

[57] ABSTRACT

A pressurized aerosol package contains a metal-containing catalytic mixture of the type used in catalytic heaters. The mixture could contain, for example, chloroplatinic acid, with other materials, such as aluminum oxide, dextrose and triethanolamine all dissolved and mixed in water. In use, the mixture is sprayed onto, and impregnates, expended carrier pads of catalytic heaters to revive the pads and permit continued use of the heaters. In addition, the mixture can be sprayed into the exhaust system of an operating engine to coat the inner walls of the muffler of the system for antipollution purifying purposes.

7 Claims, 2 Drawing Figures

CATALYTIC MIXTURE AND METHOD OF USE THEREFOR

This is a divisional of U.S. Pat. application Ser. No. 338,352, filed Mar. 5, 1973, by applicants for "A Method of Coating with a Catalytic Mixture", now U.S. Pat. No. 3,915,350.

BACKGROUND AND SUMMARY OF THE INVENTION

This invention relates to a packaged catalytic mixture and method of use therefor, and more particularly to pressurized aerosol packaged catalytic mixture used for reviving expended catalytic carrier pads and other catalytic-material-supporting services.

Catalytic heaters of the flameless type include a carrier pad which supports and carries a catalytic metal. A fuel gas, such as propane, will combust with oxygen in the air in the presence of a preheated catalytic metal such as that on the carrier pad. An example of this type of catalytic heater is illustrated and claimed in my copending application, titled "Catalytic Gas Heaters", Ser. No. 338,351., March 5, 1973.

The carrier pads are composed of fibers which are flame resistant and woven or cast or felted into a pad shape. The catalytic material, such as platinum, is coated on, and impregnates, the pad. After many uses of the heater the catalytic material is diminished in effectiveness through abrasion or poisoning. All of the elements of the heater are still in workable and usable condition except for the expended catalytic material. Therefore, there is a need for some way to renew or revive the expended catalytic material in order to permit continued and full economic use of the catalytic heater.

Additionally, mufflers are filled with catalytic materials, such as platinised alumina, which reacts with the pollutants passing therethrough to substantially reduce the pollutants and purify the remaining substance passing into the atmosphere. Frequent use of the muffler system ultimately expends the catalytic material and the muffler can no longer exhibit the pollutant-treating properties even though the remaining components of the muffler system are in working condition. Thus, there is a need for a way to restore the catalytic-material.

It is therefore an object of this invention to package a catalytic mixture in a form to permit revivication of surfaces which have a catalytic-material coating.

Another object of this invention is to package in a pressurized aerosol container a catalytic mixture to permit easy application of the mixture to selected surfaces.

Still another object of this invention is a method of coating a surface with a packaged catalytic mixture.

Other objects and attendant advantages of this invention will become more readily apparent and understood from the following detailed specification and accompanying drawings in which:

FIG. 1 is a pictorial view showing a flameless heater pad, removed from a catalytic heater, being sprayed with an active catalytic mixture; and FIG. 2 is a cutaway view of an anti-pollution type muffler used with internal combustion engines.

BRIEF DESCRIPTION OF THE INVENTION

Catalytic heaters, such as the type disclosed and claimed in my copending application "Catalytic Gas Heaters", use a carrier pad composed of flame resistant fibers which are woven, cast or felted into a pad shape. At least one surface of the pad, or each fiber thereof, is coated with a catalytic metal such as platinum. Other metals such as, for example, palladium or rhodium may be used. In use, a gas, such as propane, is passed over the preheated catalytic metal in the presence of oxygen, usually in the air. A reaction occurs which causes the heater to emit rays of radiant energy. After frequent use of the heater, the catalytic metal is expended due to chemical reaction and physical losses of the active constituents.

Usually the heaters are owned by individuals who do not have the capability or facilities to revive the catalytic metal in the heater. Therefore, a convenient manner of providing a means for such individuals to revive the carrier pads of their heaters would permit continued, economic use of the heaters without the need to purchase new heaters.

DESCRIPTION OF THE PREFERRED EMBODIMENTS

Figure 1:
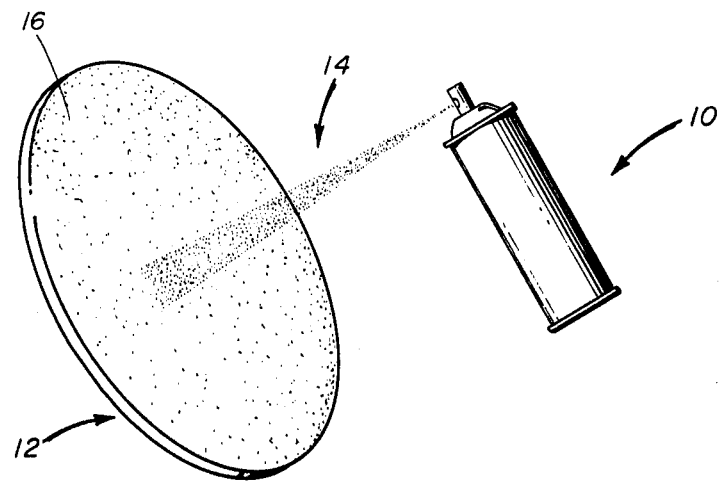

A most convenient way of providing the catalytic metal for reviving purposes is in a pressurized aerosol package. A mixture containing the catalytic metal is packaged under pressure in an aerosol dispensing container 10, as shown in FIG. 1, to permit the convenient and easy dispensing of the mixture. The container 10 includes a conventional release nozzle for permitting the selective release of the catalytic mixture from the container.

The mixture contains an aerosol propellant mixed with a catalytic mixture such as, for example, any one of several mixtures disclosed in my copending application titled "Catalytic Mixture," Ser. No. 348,075 filed Apr. 5, 1973, which has since been issued as U.S. Pat. No. 3,835,066 on Sept. 10, 1974.

For example, the catalytic mixture could contain chloroplatinic acid which could be mixed with aluminum oxide, dextrose and triethanolamine. Or the acid could be mixed with sodium citrate. In each instance the ultimate mixture is mixed and dissolved with water.

Specifically,, 5.112 grams of the acid are mixed with 12.24 grams of aluminum oxide, 8.16 grams of dextrose and 7.4 milliliters of triethanolamine. This is mixed and dissolved with sufficient water to make up to 2400 milliliters of the catalytic mixture. In addition 2.5 milliliters of a dispensing agent, such as that commercially available under the name Triton X-100 from Rohm and Haas Co., may be added to the total mixture.

Either 0.5 gram or 2.00 grams of sodium citrate can be added to 0.25 grams of platinum as chloroplatinic acid, and then mixed and dissolved with sufficient water to make 400 milliliters of the catalytic mixture.

In another example, a salt of platinum, such as ammonium chloroplatinite, is mixed with dimethyl formamide and hot water to form the catalytic mixture. For example, 0.5 grams of ammonium chloroplatinite is mixed with 50 L milliliters of dimethyl formamide and dissolved in sufficient hot water to make 400 milliliters of the catalytic mixture.

In each of the foregoing examples, an aerosol propellant is mixed with the catalytic mixture and packaged under pressure in the container 10.

Referring to FIG. 1, the container 10 is positioned adjacent to a carrier pad 12 whose catalytic metal has been expended through constant and frequent use. Under pressure, a spray 14 of the catalytic mixture is directed onto the pad 12 to form a coating 16. The catalytic mixture could be any of the aforementioned mixtures.

Figure 2:
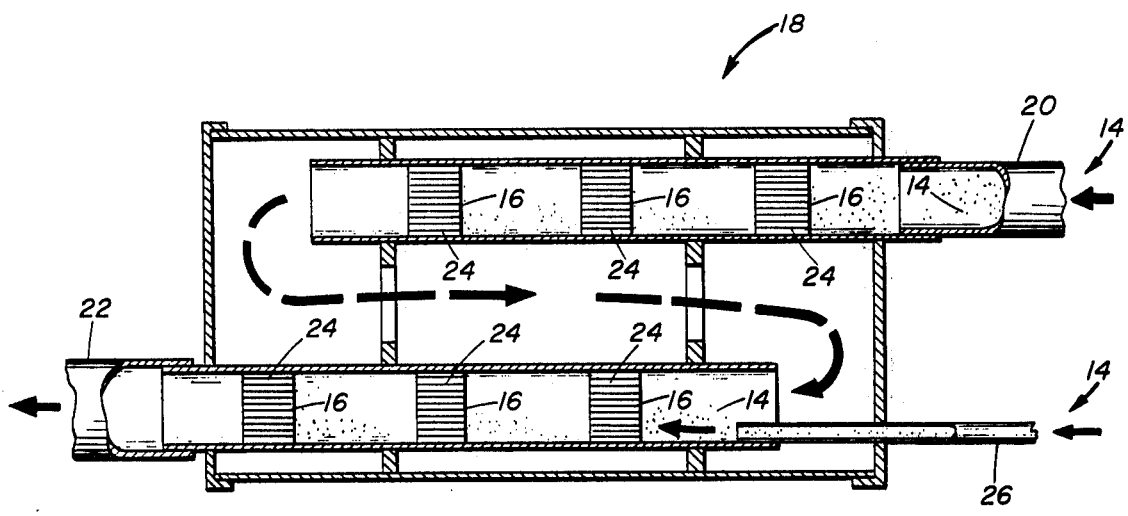

Referring to FIG. 2, an anti-pollution type muffler 18 used with an internal combustion engine (not shown) includes an intake pipe 20 into which exhausts from the engine are discharged. The exhausts pass through the muffler 18 and the remaining matter which is not chemically removed passes through the exit pipe 22. A series of honeycomb elements 24 are normally coated with a catalytic metal and react chemically with the pollutants in the exhausts to remove the pollutants before being discharged into the atmosphere. A forced air inlet pipe 26 is used during operation of the muffler 18 and injects air into a lower portion of the muffler to assist in the normal operation of pollutant-removing function of the muffler.

As noted, the honeycomb elements 16 are normally coated with a catalytic metal such as platinum. After repeated usage, the catalytic metal is eventually expended. In order to replace the metal coating, the aerosol spray container 10 (FIG. 1) is used to spray the catalytic mixture directly into the exhausts of the engine so that the spray 14 enters the muffler 18 through the inlet pipe 20. The normal flow of exhausts through the muffler 18 is indicated by dashed, arrowhead lines. As the exhausts move through the muffler 18, the honeycomb elements 24 are provided with a coating 16 of the catalytic mixture. To insure that the honeycomb elements 24 in the lower section of the muffler 18 are coated, the spray 14 can be directed into the forced air inlet pipe 26. The coating 16 of catalytic material is then applied to the honeycomb elements 24 as the forced air moves through the lower section of the muffler 18.

The muffler 18 can be removed from connection to the engine and the forced air input and the spray 14 sprayed directly into the muffler without assistance from the exhausts and forced air flows through the muffler.

The aerosol propellant used in the package could be any of many well known propellants which will mix readily with any of the aforementioned catalytic mixtures without destroying the catalytic mixture.

In any of the above examples of applying the catalytic mixture to surfaces, such as the pad 12 and the honeycomb elements 24 of the muffler 18, the surfaces should be heated to about 750° Fahrenheit for a period of about 4 hours after application of the spray 14 to precipitate the platinum from the catalytic mixture.

Although the packaging of the catalytic mixture has been illustrated as being placed in the pressurized aerosol container 14, the mixture could be packaged in an unpressurized container and applied, for example, with a brush or with compressed gases or by mechanical pump. However, the use of the aerosol spray 14 is most expedient and preferred.

Obviously many modifications and variations of the present invention are possible in light of the above teachings. It is, therefore, to be understood that within the scope of the appended claims the invention may be practiced otherwise than as specifically described.

What is claimed is:

1. A method of rejuvenating a spent catalyst-coated surface, comprising the steps of:

applying to said surface an aqueous composition selected from the group consisting of (1) chloroplatinic acid, a high surface refractory, dextrose, and triethanolamine, (2) chloroplatinic acid and sodium citrate, (3) ammonium chloroplatinite and dimethyl form amide; and heating the applied mixture, whereby a catalyst which has lost its catalytic activity in service may be rejuvenated.

2. The method of claim 1, wherein said composition comprises chloroplatinic acid which is mixed with aluminum oxide, dextrose, triethanolamine, and water.

3. The method of claim 2, wherein the constituents are present in the mixture in the proportions of 5.112 grams of chloroplatinic acid, 12.24 grams of aluminum oxide, 8.16 grams of dextrose, 7.4 milliliters of triethanolamine, and sufficient water to make up to 2400 milliliters of mixture.

4. The method of claim 1 wherein the constituents are present in the mixture in the proportion of 0.25 gram of chloroplatinic acid, 0.5 to 2.00 grams of sodium citrate, and sufficient water to make up to 400 milliliters of the mixture.

5. The method of claim 1 wherein the constituents are present in the mixture in the proportions of 0.5 gram of ammonium chloroplatinite, 50 milliliters of dimethyl formamide, and sufficient water to make up to 400 milliliters of the mixture.

6. The method of claim 1, which further comprises the step of spraying said mixture into the inlet side of a muffler while said muffler is in operation so that normal flow of gases over the muffler assists in carrying the sprayed mixture to surfaces within the muffler.

7. The method of claim 6, and further comprising the step of spraying said mixture into a forced air inlet of an internal combustion engine to which the muffler is connected while said internal combustion engine is in operation so that the normal flow of the forced air therethrough assists in carrying the sprayed mixture to surfaces within the muffler.

* * * * *